United States Patent
Yamaji

(10) Patent No.: US 8,872,892 B2
(45) Date of Patent: Oct. 28, 2014

(54) IMAGE PROCESSING APPARATUS AND IMAGE PROCESSING METHOD AS WELL AS IMAGE PROCESSING SYSTEM FOR PROCESSING VIEWPOINT IMAGES WITH PARALLAX TO SYNTHESIZE A 3D IMAGE

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 77 days.

(21) Appl. No.: 13/402,443

(22) Filed: Feb. 22, 2012

(65) Prior Publication Data

US 2012/0235990 A1   Sep. 20, 2012

(30) Foreign Application Priority Data

Mar. 15, 2011   (JP) ................. 2011-056488

(51) Int. Cl.
*H04N 13/00* (2006.01)
*H04N 13/02* (2006.01)

(52) U.S. Cl.
CPC ......... *H04N 13/0011* (2013.01); *H04N 13/022* (2013.01); *H04N 13/0239* (2013.01)
USPC .......................................................... 348/42

(58) Field of Classification Search
CPC ................................. H04N 13/0239
USPC ................................................. 348/42
See application file for complete search history.

(56) References Cited

U.S. PATENT DOCUMENTS

| | | | |
|---|---|---|---|
| 2003/0026474 A1* | 2/2003 | Yano | 382/154 |
| 2008/0075416 A1 | 3/2008 | Mochizuki et al. | |
| 2008/0158346 A1* | 7/2008 | Okamoto et al. | 348/47 |

FOREIGN PATENT DOCUMENTS

| | | |
|---|---|---|
| JP | 08-205203 | 8/1996 |
| JP | 09-191393 | 7/1997 |
| JP | 2003-331317 | 11/2003 |
| JP | 2005-159755 | 6/2005 |
| JP | 4442190 | 1/2010 |

OTHER PUBLICATIONS

Chinese Official Action—201210048725.9—Jun. 11, 2014.

* cited by examiner

*Primary Examiner* — Geepy Pe
*Assistant Examiner* — James Pontius
(74) *Attorney, Agent, or Firm* — Young & Thompson

(57) ABSTRACT

An image processing apparatus includes a monitor that displays an image based on a right viewpoint image and left viewpoint image, or multi-viewpoint images. The displayed image is used by a user for specifying an indispensable output area which the user wants to be included in a 3D image. The apparatus further includes an input device inputting information on the indispensable output area as specified by the user referring to the image as displayed on the monitor, a control unit causing the indispensable output area to be indicated in the image, and an output device outputting the right viewpoint image and left viewpoint image, or multi-viewpoint images, and information on the indispensable output area.

16 Claims, 13 Drawing Sheets

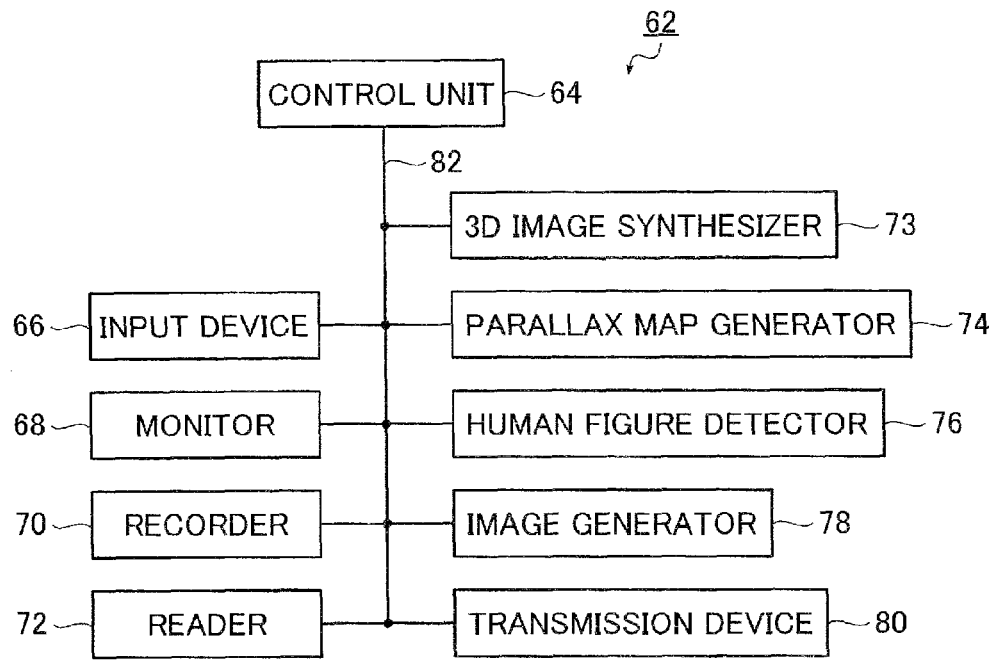
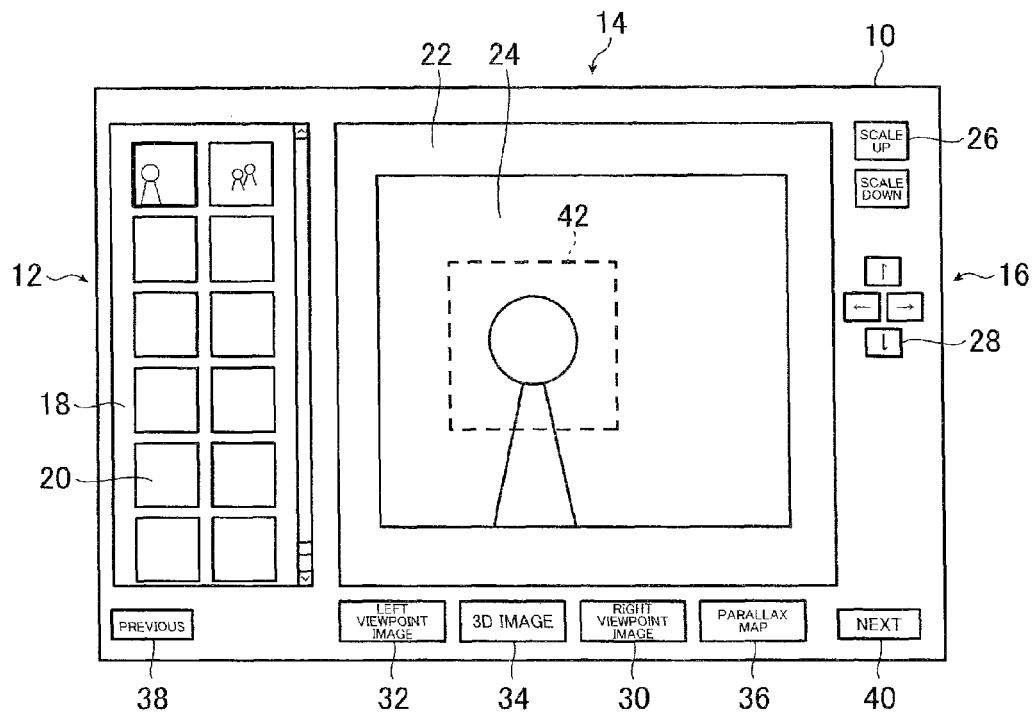

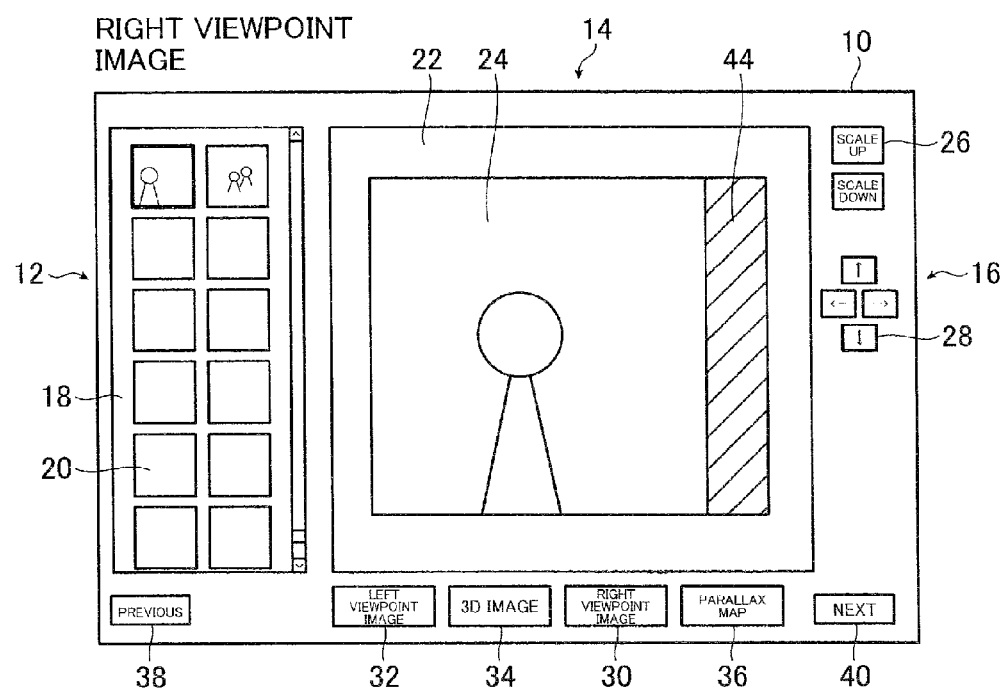
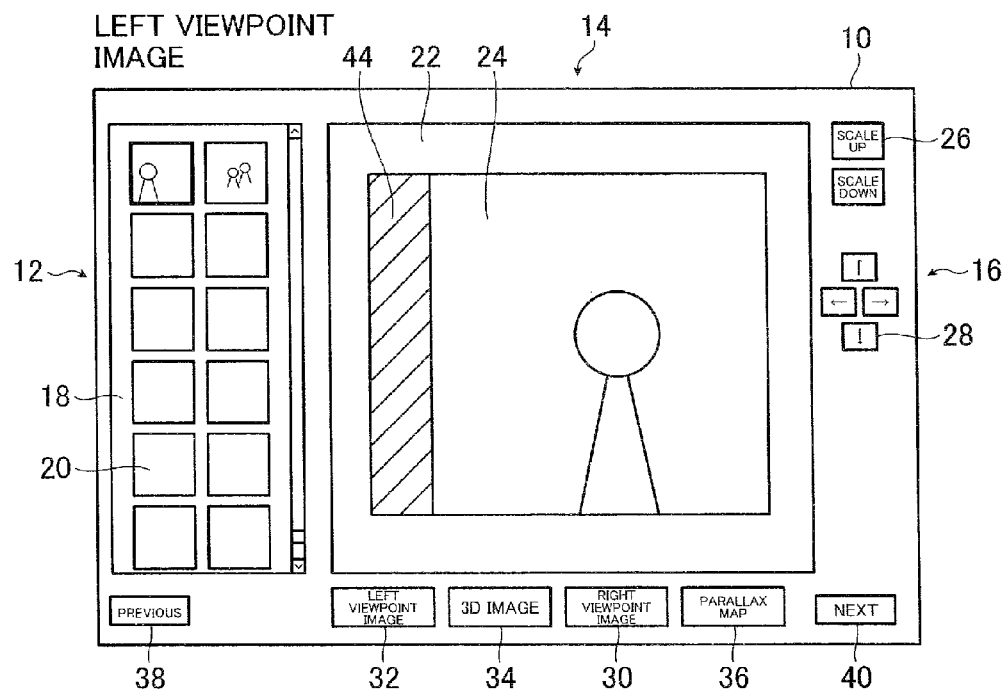

IMAGE PROCESSING APPARATUS AND IMAGE PROCESSING METHOD AS WELL AS IMAGE PROCESSING SYSTEM FOR PROCESSING VIEWPOINT IMAGES WITH PARALLAX TO SYNTHESIZE A 3D IMAGE

BACKGROUND OF THE INVENTION

The present invention relates to image processing apparatus and image processing methods for processing a right viewpoint image and a left viewpoint image, or multi-viewpoint images, with parallax, as well as image processing systems.

It is known that a human being perceives the third dimension of an object by viewing the object with his/her right and left eyes at different angles and distances. The difference in appearance of the object as viewed with the right and left eyes is referred to as parallax, and the magnitude of the parallax is referred to as the amount of parallax (amount of vision disparity).

Up until today proposed were methods of exploiting the principle of third dimension perception by human beings to make people recognize two 2D images with parallax as a stereo image (3D image). As an example: If one and the same subject is shot at different angles from two viewpoints positioned right and left, respectively, to obtain a right viewpoint image and a left viewpoint image with parallax, and the right viewpoint image is presented to the right eye of a person, while the left viewpoint image is presented to the left eye, the person recognizes the two 2D images as one 3D image.

Since the third dimension perception by human beings is according to the magnitude of the parallax, a stereoscopic impression (or, the depth) of a 3D image can be modified by displacing right and left viewpoint images physically in horizontal directions to adjust the amount of parallax.

The amount of parallax is known to depend on the size of the 3D image to be displayed, with a larger size increasing the amount of parallax between a right viewpoint image and a left viewpoint image, and the 3D image depth as well. It is also known that a 3D image is presented as a superposition of a right viewpoint image and a left viewpoint image, and the superposition, that is to say, a portion displayable as a 3D image varies in range with the amount of parallax.

In the case of human beings, the distance between the right and left eyes (interpupillary distance) is about 65 mm on average, and such a distance is considered optimal as the distance between lenses for the conventional 3D shooting. In contrast, the assignee of the present application, FUJIFILM Corporation, has disclosed a stereoscopic camera (3D digital camera) in which the distance between two lenses used for taking right and left viewpoint images, respectively, is increased from the conventional one by ca. 20%. The camera as such somewhat enhances the 3D image depth in comparison with the third dimension of the subject that is perceived by human eyes. In addition, this stereoscopic camera has a parallax adjusting function capable of being toggled between automatic and manual modes, which makes it possible to take and appreciate a natural 3D image irrespective of the distance to the subject.

It is said that human beings receive a stereoscopic impression owing to "binocular parallax" caused by the differences between the right and left eyes in viewing angle and distance. For the LCD monitor of the stereoscopic camera as above, the 3D image displaying technologies which the assignee of the present application has developed on its own, such as "Light Direction Control System" and "Parallax Barrier System," are employed. By the technologies, lights entering into the right and left eyes, respectively, are controlled in direction with high precision to project different images onto the two eyes, and thereby allow a natural, stereoscopic impression to be received with the naked eye.

The patent documents as mentioned below are prior art documents related to the present invention.

JP 4442190 B describes that a marginal region is provided on each of the right and left sides of a right viewpoint image, and an image for stereopsis is appropriately produced, with no areas thereof being made undisplayable, even if the right viewpoint image or a left viewpoint image is slid.

JP 8-205203 A describes that a 3D image is obtained by horizontally shifting a left eye image and a right eye image to the right and the left, respectively, by a specified number of pixels to thereby cause the entire image displayed to appear protruding forward from the display screen. It is also described in the patent document that the displayed image will lack a right end portion of a left eye image and a left end portion of a right eye image if left and right eye video signals are horizontally shifted.

JP 2003-331317 A describes that a parallax map expressing the depth distribution for a subject is prepared with respect to image comprised of a plurality of layers from information on areas selected in the individual layers, and on spacings between the individual layers, and multi-viewpoint images are generated from the parallax map and a 2D image.

JP 9-191393 A describes that, during the production of an image for stereopsis from two-dimensional images, the entire original may not be recorded on a sheet of recording paper due to the relationship among the sizes of the original and the sheet of paper, the scaling factor, and the amount of displacement, and, in that case, the event is made known on a display.

During photo printing of a 3D image taken with a stereoscopic camera, a printing order is received through an order receiving apparatus (shopfront order receptor) placed in an agency dealing with photo printing of 3D images, a webpage on the Internet or the like, and image data (3D image data) on the 3D image, order information, and so forth are sent to a laboratory for photo printing of 3D images. In the laboratory, the amount of parallax between a right viewpoint image and a left viewpoint image is manually adjusted by an operator to make the photo print in which the depth of the 3D image is modified.

When a 3D image is synthesized from a right viewpoint image and a left viewpoint image, the two viewpoint images are physically shifted in horizontal directions to adjust the amount of parallax and thereby modify the depth of the 3D image, as mentioned before. Since a 3D image is limited to a superposition of a right viewpoint image and a left viewpoint image, there may arise a problem with photo printing of a 3D image, that is to say, a photo print actually received by an orderer (user) may differ from that expected by the orderer in printed area depending on the degree of parallax adjustment.

SUMMARY OF THE INVENTION

It is an object of the present invention to provide an image processing apparatus and an image processing method each allowing synthesis of a 3D image never missing the area whose output (display) is expected by a user, as well as an image processing system involving such an apparatus or method.

In order to achieve the above object, the present invention provides an image processing apparatus for processing a right viewpoint image and a left viewpoint image, or multi-viewpoint images, with parallax, comprising:

a monitor for displaying an image based on the right viewpoint image and left viewpoint image, or multi-viewpoint images, with the displayed image being used by a user for specifying an indispensable output area which the user wants to be included in a 3D image synthesized by merging the right viewpoint image and left viewpoint image, or multi-viewpoint images, together, and outputted;

an input device for inputting information on the indispensable output area as specified by the user referring to the image as displayed on the monitor;

a control unit for causing the indispensable output area to be indicated in the image as displayed on the monitor; and an output device for outputting the right viewpoint image and left viewpoint image, or multi-viewpoint images, and information on the indispensable output area.

Preferably, the image processing apparatus further comprises a parallax map generator for generating a parallax map as a visualization of parallaxes between corresponding pixels of said right viewpoint image and left viewpoint image, or two images out of said multi-viewpoint images, wherein:

said monitor is adapted to display the parallax map as an image used for specifying said indispensable output area in pseudocolor or gray scale in accordance with the parallaxes.

Preferably, the image processing apparatus further comprises a 3D image synthesizer for synthesizing a 3D image from said right viewpoint image and left viewpoint image, or multi-viewpoint images, wherein:

said monitor is adapted to display a 3D image synthesized by the 3D image synthesizer as an image used for specifying said indispensable output area.

Preferably, if said right viewpoint image and left viewpoint image are to be processed, said monitor is adapted to display the right viewpoint image and the left viewpoint image concurrently as an image used for specifying said indispensable output area; and said input device is used to input information on the indispensable output area which is specified by said user referring to the right viewpoint image or left viewpoint image as displayed on the monitor.

Preferably, said monitor is adapted to display said right viewpoint image, said left viewpoint image, or any one image out of said multi-viewpoint images designated by said user as an image used for specifying said indispensable output area.

Preferably, said control unit also causes an area out of mergence to be indicated in the image as displayed on said monitor, with the area out of mergence being unable to be included in said 3D image outputted, and being defined in accordance with an amount of parallax between said right viewpoint image and left viewpoint image, or two images out of said multi-viewpoint images, when the 3D image is synthesized by merging the right viewpoint image and left viewpoint image, or multi-viewpoint images, together.

Preferably, said control unit is adapted to restrict a range in which said user is able to specify said indispensable output area to a mergeable area other than said area out of mergence, when the user specifies the indispensable output area.

Preferably, said control unit adapted to warn that said indispensable output area and said area out of mergence overlap if the indispensable output area is so specified as to overlap the area out of mergence.

Preferably, said control unit is adapted to define said area out of mergence in accordance with a position selected in a parallax adjustment range and inputted through said input device by said user.

Preferably, the image processing apparatus further comprises a human figure detector for detecting a person contained in the image as displayed on said monitor, wherein:

said control unit is adapted to define said area out of mergence so that the person as detected by the human figure detector may not be contained in the area out of mergence.

Preferably, the image processing apparatus further comprises a human figure detector for detecting a person contained in the image as displayed on said monitor, wherein:

said control unit is adapted to check a 3D image depth throughout the image based on said parallax map, automatically select an area in which the 3D image depth is maximum for the person as detected by the human figure detector as said indispensable output area, and cause the selected area to be indicated on said monitor.

Preferably, the image processing apparatus further comprises an image generator for generating a plurality of output samples of an output size inputted through said input device, which differ from one another in an output area for said 3D image and include said indispensable output area, wherein:

said control unit causes the output samples differing from one another in the output area to be displayed on said monitor.

Preferably, with respect to an output sample in which said output area is vertically made smaller than said indispensable output area if the output area is reduced in size as said area out of mergence horizontally gets larger, with the output area and the area out of mergence being kept touching each other at their corresponding horizontal ends, and an aspect ratio of the output area being maintained, said control unit is adapted to rotate the output area 90 degrees and make it larger, while maintaining its aspect ratio, so that the output area as rotated and the area out of mergence may touch each other at their corresponding horizontal ends, and the output area as rotated may be at least equal to the indispensable output area in vertical size.

Preferably, if said indispensable output area is so specified as to overlap said parallax adjustment range, said control unit is adapted not to cause an output sample, in which the indispensable output area and said area out of mergence overlap, to be displayed on said monitor.

Also, the present invention provides an image processing system, comprising first and second image processing apparatus which are each the image processing apparatus described above, wherein:

the second image processing apparatus further comprises an acceptance device for accepting said right viewpoint image and left viewpoint image, or multi-viewpoint images, and information on said indispensable output area;

the output device of the first image processing apparatus is adapted to output the right viewpoint image and left viewpoint image, or multi-viewpoint images, and information on the indispensable output area; and the acceptance device of the second image processing apparatus is adapted to accept the right viewpoint image and left viewpoint image, or multi-viewpoint images, and the information on the indispensable output area as outputted from the first image processing apparatus.

Preferably, the control unit of said second image processing apparatus is adapted to cause an indispensable output area accepted from said first image processing apparatus to be indicated in the image as displayed on the monitor of the second image processing apparatus.

Preferably, the image processing system further comprises a laboratory for synthesizing a 3D image from said right viewpoint image and left viewpoint image, or multi-viewpoint images, and the information on said indispensable output area, and making a print of the 3D image.

Also, the present invention provides an image processing method for processing a right viewpoint image and a left viewpoint image, or multi-viewpoint images, with parallax, comprising:

displaying an image on a monitor based on the right viewpoint image and left viewpoint image, or multi-viewpoint images, with the displayed image being used by a user for specifying an indispensable output area which the user wants to be included in a 3D image synthesized by merging the right viewpoint image and left viewpoint image, or multi-viewpoint images, together, and outputted;

inputting through an input device information on the indispensable output area as specified by the user referring to the image as displayed on the monitor;

causing, by a control unit, the indispensable output area to be indicated in the image as displayed on the monitor; and outputting the right viewpoint image and left viewpoint image, or multi-viewpoint images, and the information on the indispensable output area from an output device.

Also, the present invention provides an image processing method applicable to an image processing system comprising first and second image processing apparatus which are each the image processing apparatus described above, with the second image processing apparatus further comprising an acceptance device for accepting said right viewpoint image and left viewpoint image, or multi-viewpoint images, and information on said indispensable output area, wherein:

the output device of the first image processing apparatus outputs the right viewpoint image and left viewpoint image, or multi-viewpoint images, and information on the indispensable output area; and the acceptance device of the second image processing apparatus accepts the right viewpoint image and left viewpoint image, or multi-viewpoint images, and the information on the indispensable output area as outputted from the first image processing apparatus.

According to the present invention, the amount of parallax is adjusted using information on the indispensable output area (indispensable display area) which is specified by a user. Consequently, a 3D image never missing the area whose output (display) is expected by the user is synthesized.

BRIEF DESCRIPTION OF THE DRAWINGS

In the accompanying drawings:

FIG. 1 is a block diagram of an embodiment of the order receiving apparatus according to the present invention, representing the inner structure thereof;

FIG. 2 is a schematic diagram of an exemplary display screen of a monitor;

FIG. 10 is a diagram schematically illustrating that an area out of mergence is indicated in a right viewpoint image in a superimposed manner;

FIG. 11 is a diagram schematically illustrating that an area out of mergence is indicated in a left viewpoint image in a superimposed manner;

DETAILED DESCRIPTION OF THE INVENTION

Figure 3:
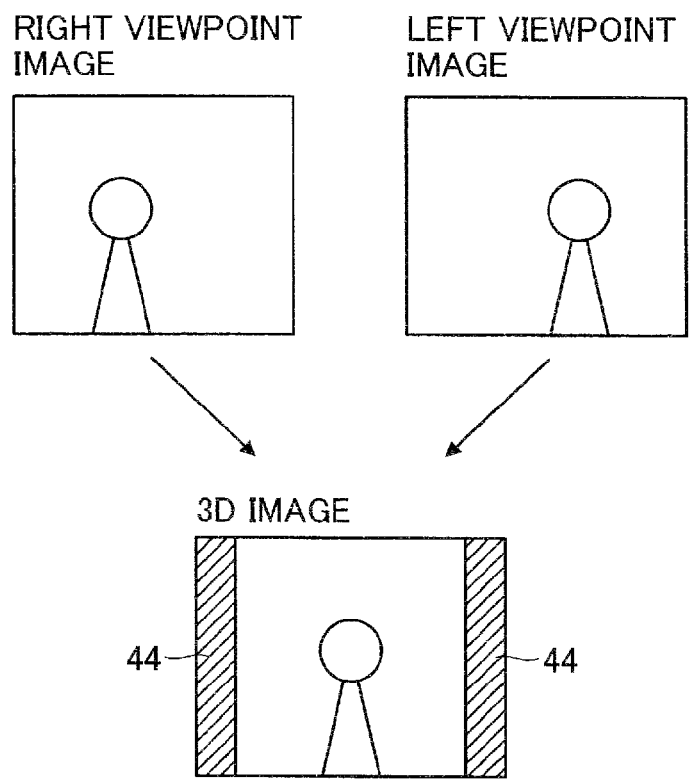
FIG. 3 is a diagram schematically showing examples of the selected image.

In the following, the image processing apparatus and the image processing method as well as the image processing system according to the present invention are detailed in reference to the preferred embodiments as shown in the accompanying drawings. The inventive image processing apparatus may be embodied in an order receiving apparatus, and the following description is made based on the order receiving apparatus as an example.

FIG. 1 is a block diagram of an embodiment of the order receiving apparatus according to the present invention, representing the inner structure thereof. An order receiving apparatus 62 shown in the figure is adapted to receive an order for the synthesis of a 3D image by merging a right viewpoint image and a left viewpoint image with parallax, which are obtained by shooting a subject at two different viewpoints, namely right and left viewpoints, and the photo printing of the 3D image. The order receiving apparatus 62 is comprised of a control unit 64, an input device 66, a monitor 68, a memory 70, a reader 72, a 3D image synthesizer 73, a parallax map generator 74, a human figure detector 76, an image generator 78, and a transmission device (telecommunications device) 80.

Synthesis of a 3D image does not necessarily need to be carried out by merging right and left viewpoint images together. A 3D image may be synthesized from multi-viewpoint images with a plurality of (that is to say, three or more) different viewpoints. Multi-viewpoint images may be obtained by shooting a subject with a camera having three or more different viewpoints, or subjecting an image with one viewpoint to image processing for generating multi-viewpoint images. In addition, photo printing may be replaced by printing of an illustration or an animation character.

The control unit 64 controls operations of the order receiving apparatus 62 as a whole, that is to say, controls the operations of the input device 66, the monitor 68, the memory 70, the reader 72, the 3D image synthesizer 73, the parallax map generator 74, the human figure detector 76, the image generator 78, and the transmission device 80 as described later. The control unit 64, the input device 66, the monitor 68, the memory 70, the reader 72, the 3D image synthesizer 73, the parallax map generator 74, the human figure detector 76, the image generator 78, and the transmission device 80 are connected with one another through a signal line 82.

FIG. 2 is a schematic diagram of an exemplary display screen of the monitor 68 of the order receiving apparatus 62. The figure represents the scene which may be displayed on the display screen of the monitor 68 when a 3D photo printing order is to be received. The monitor 68 displays an image based on right and left viewpoint images (or multi-viewpoint images), with the displayed image being used for specifying an indispensable print area wanted to be reproduced in a print (indispensable output area (e.g., indispensable display area) wanted to be included in a 3D image outputted (displayed)), and is a touch panel allowing a user to give information on locations of touched places, and various instructions to the order receiving apparatus 62 by touching its screen with a finger or a dedicated pen. The scene as displayed on a display screen 10 shown in the figure has an image list displaying section 12, a selected image displaying section 14, and an operating button displaying section 16.

The image list displaying section 12 is the section in which images are displayed in the form of a thumbnail image list, whereupon a user is going to place a 3D photo printing order with respect to the displayed images. A display window 18 at the left of the display screen 10 serves as the section 12. While the number of thumbnail images 20 displayed in the display window 18 at a time is limited, the thumbnail images 20 to be displayed may be changed using a scroll bar provided along the right side of the display window 18.

The selected image displaying section 14 is the section in which an image selected by an orderer (user) from among the thumbnail images 20 as displayed in the display window 18 of the image list displaying section 12 is displayed in a scaled-up form. A display window 22 in the middle of the display screen 10 serves as the section 14. In FIG. 2, a right viewpoint image as the selected image 24 which corresponds to the thumbnail image 20 as displayed at the left top of the display window 18 is shown as being displayed in the display window 22 of the selected image displaying section 14.

The operating button displaying section 16 is the section in which various operating buttons are displayed. In the example as shown in FIG. 2, "scale up" and "scale down" buttons 26 and "cursor" buttons 28 are displayed along a right part of the display screen 10, and a "right viewpoint image" button 30, a "left viewpoint image" button 32, a "3D image" button 34, a "parallax map" button 36, a "previous" button 38, and a "next" button 40 along a lower part of the display screen 10.

The "scale up" and "scale down" buttons 26 and the "cursor" buttons 28 are operating buttons used for designating the degrees of scale up/down and displacement of an indispensable print area 42, respectively, during the specification of the area 42. The indispensable print area 42 is the area which a user wants to be indispensably reproduced in a photo print.

The indispensable print area 42 may be in the shape of a rectangle with any aspect ratio or a circle. The monitor 68 of this embodiment as a touch panel allows an orderer referring to the selected image as displayed on the display screen 10 to specify the indispensable print area 42 by sliding the tip of a finger or pen on the screen 10. If the monitor 68 is not a touch panel, the indispensable print area 42 can be specified by a known method using the input device 66 which may be a mouse.

The "right viewpoint image" button 30, the "left viewpoint image" button 32, the "3D image" button 34, and the "parallax map" button 36 are operating buttons used for changing the selected image 24 to be displayed among a right viewpoint image, a left viewpoint image, a 3D image (stereo image), and a parallax map.

The "previous" button 38 and the "next" button 40 are operating buttons used for moving the scene as currently displayed on the display screen 10 to the previous and next scenes, respectively.

FIG. 3 schematically shows examples of the selected image 24 displayed in the display window 22 of the selected image displaying section 14. A right viewpoint image such as shown in an upper left part of the figure is displayed if the "right viewpoint image" button 30 is selected, while a left viewpoint image such as shown in an upper right part is displayed if the "left viewpoint image" button 32 is selected. In the case where the order receiving apparatus 62 includes the 3D image synthesizer 73 for synthesizing a 3D image by merging right and left viewpoint images (or multi-viewpoint images), and the monitor 68 has a function of displaying 3D images, a 3D image such as shown in a lower part of the figure is displayed if the "3D image" button 34 is selected.

During synthesis of a 3D image, areas out of mergence 44 are generated in the image in accordance with the amount of parallax, with the areas 44 being areas unable to be reproduced in a photo print of the 3D image. As described before, a 3D image is synthesized by physically displacing right and left viewpoint images in horizontal directions before superimposing them on each other. Consequently, certain areas at the right and left ends of the selected image 24, which are out of superposition due to a horizontal displacement of right and left viewpoint images, constitute the areas out of mergence 44, as shown in FIG. 3.

If the monitor 68 has no function of displaying 3D images, the "3D image" button 34 may be omitted.

Figure 4A:
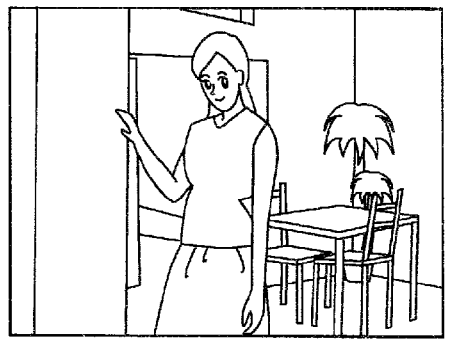
FIGS. 4A and 4B are diagrams schematically showing another example of the selected image.
Figure 4B:
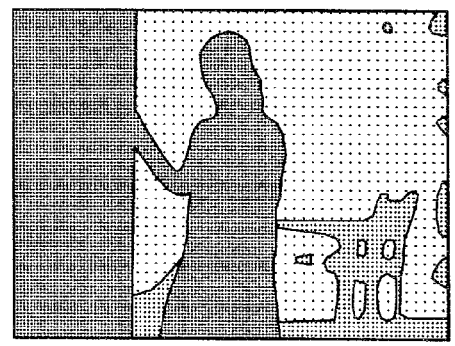

FIGS. 4A and 4B schematically show another example of the selected image 24 displayed in the display window 22 of the selected image displaying section 14. With respect to the image as shown in FIG. 4A, such a parallax map as shown in FIG. 4B is displayed if the "parallax map" button 36 is selected. A parallax map is a visualization of parallaxes between corresponding pixels of a right viewpoint image and a left viewpoint image (or one multi-viewpoint image and another multi-viewpoint image), and is generated by the parallax map generator 74. The parallax map as shown is displayed in pseudocolor in accordance with parallaxes, with areas of larger parallaxes being displayed in red and areas of smaller parallaxes in blue, for instance. The parallax map may also be displayed in gray scale.

The orderer who places a 3D photo printing order in accordance with the image processing method of the present invention acts as follows.

The orderer installs the recording medium such as a memory card, in which image data on right and left viewpoint images (or multi-viewpoint images) are recorded, in the reader 72 adapted for image data reading, so that the image data on right and left viewpoint images (or multi-viewpoint images) are read from the recording medium and stored in the memory 70, and the thumbnail images 20 for right viewpoint images are displayed in the display window 18 of the image list displaying section 12, under control of the control unit 64.

The image data on right and left viewpoint images (or multi-viewpoint images) as stored in the memory 70 are used in the control unit 64, the monitor 68, the memory 70, the reader 72, the parallax map generator 74, the human figure detector 76, the image generator 78, and the transmission device 80.

The orderer then selects one thumbnail image 20 from among the thumbnail images 20 as displayed in the display window 18 of the image list displaying section 12 using the touch panel, and a right viewpoint image as the selected image 24 which corresponds to the selected thumbnail image 20 is displayed in a scaled-up form in the display window 22 of the selected image displaying section 14.

The orderer is capable of changing at any time the selected image 24 to be displayed among a right viewpoint image, a left viewpoint image, a 3D image, and a parallax map under control of the control unit 64 by appropriately selecting the "right viewpoint image" button 30, the "left viewpoint image" button 32, the "3D image" button 34, or the "parallax map" button 36. The orderer is also capable of selecting a desired one from among a plurality of multi-viewpoint images with different viewpoints so as to make the selected image displayed.

If the printing of a 3D image synthesized from right and left viewpoint images is ordered, the two viewpoint images may be displayed concurrently. In that case, the orderer may use the input device 66 to designate the right or left viewpoint image as displayed in the display window 22 of the selected image displaying section 14, and input information on an indispensable print area while referring to the designated image.

Figure 5:
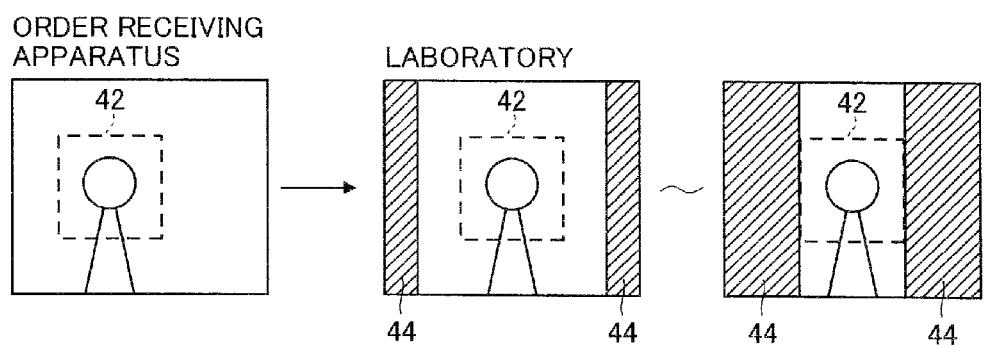
FIG. 5 is a schematic diagram for explaining actions of an orderer placing a 3D photo printing order.

Subsequently, the orderer refers to the selected image 24 as displayed in the display window 22 of the selected image displaying section 14 so as to specify the indispensable print area 42 by selecting the "scale up" and "scale down" buttons 26 and the "cursor" buttons 28, with the area 42 being specified in the shape of a dotted-lined rectangle represented in the display screen of an order receiving apparatus as shown at the left of FIG. 5. The indispensable print area 42 thus specified is indicated in the selected image 24 as displayed in the display window 22 in a superimposed manner under control of the control unit 64. The above process for selecting the thumbnail image 20 in which the indispensable print area 42 is wanted to be specified, and specifying the indispensable print area 42 in the selected image 24 which corresponds to the selected thumbnail image 20 is repeated.

An appropriate change of the selected image 24 to be displayed among a right viewpoint image, a left viewpoint image, and a 3D image allows the orderer to specify the indispensable print area 42 while examining the 3D image depth throughout the image 24. By the display of a parallax map instead of a 3D image, the orderer is also allowed to specify the indispensable print area 42 while examining the 3D image depth throughout the image 24 even if the monitor 68 has no function of displaying 3D images.

As described above, the monitor 68 has a function of displaying a 3D image or a parallax map during the specification of the indispensable print area 42, so that it is helpful for the orderer in specifying the area 42 because the orderer is always able to examine the 3D image depth throughout the selected image 24 on the monitor 68.

Figure 6A:
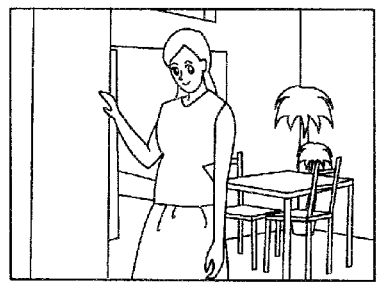
FIGS. 6A and 6B are diagrams schematically illustrating that an indispensable print area is automatically indicated in the selected image.
Figure 6B:
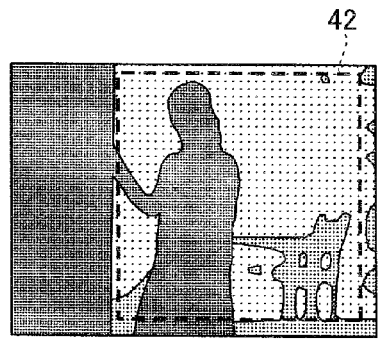

It is also thinkable that a person contained in the selected image 24 is detected by the human figure detector 76 performing face detection, for instance, then, by the control unit 64, the 3D image depth is checked throughout the image 24 as shown in FIG. 6A based on a parallax map corresponding to the image 24 as shown, the area in which the 3D image depth is the largest for the person is automatically selected as the indispensable print area 42 which is initially selected as a recommended one, and the selected area is indicated in the parallax map as shown in FIG. 6B. In that case, the indispensable print area 42 as initially selected in an automatic manner may be corrected by the orderer as appropriate.

If the indispensable print area 42 is to be automatically selected, it is desirable that the area in which the 3D image depth is larger for an object other than person than for a person is not selected as the indispensable print area 42. In the example as shown, the leftward area of the selected image 24 as shown in FIG. 6A that contains a wall is not selected, and not indicated in the parallax map of FIG. 6B, either.

After specifying the indispensable print area 42, the orderer selects the "next" button 40 to change the scene as displayed on the display screen 10 for the next. For each selected image 24, image data on right and left viewpoint images (or multi-viewpoint images) corresponding to the relevant image 24 and information on the indispensable print area 42 for the viewpoint images are associated with each other, and sequentially sent from the transmission device 80 to a reception device of a laboratory for synthesis and photo printing of 3D images via telecommunications lines such as the Internet.

Image data on right and left viewpoint images and information on an indispensable print area for the viewpoint images are not limited to being sent from the order receiving apparatus 62 to the laboratory via telecommunications lines. For instance, the image data and information as above may be stored in a recording medium on the order receiving apparatus 62, and read from the medium in the laboratory. In other words, nothing is required of the order receiving apparatus 62 but to output image data on right and left viewpoint images and information on an indispensable print area for the viewpoint images to the outside (through transmission and reception via telecommunications lines, data input and output using a recording medium, or the like), whereupon a telecommunications means (transmission means, reception means), a means for recording on a recording medium, and so forth are usable as an output means.

In the laboratory, an operator uses the information on the indispensable print area 42 to adjust the amount of parallax, namely the 3D image depth, within such a range that the area 42 is indispensably included in a 3D image synthesized, as seen from the rightward part of FIG. 5 that shows display screens in the laboratory, so as to synthesize a 3D image from the image data on the right and left viewpoint images (or multi-viewpoint images) and make a photo print of the 3D image.

A 3D image does not necessarily need to be synthesized in the laboratory from the image data on the right and left viewpoint images and the information on the indispensable print area for the viewpoint images. In other words, means for synthesizing and printing 3D images are not limited to being provided in the laboratory. A personal computer may be used to synthesize a 3D image from the image data on the right and left viewpoint images and the information on the indispensable print area for the viewpoint images, and a print of the 3D image may be made by the printing means (e.g., print management software, printer) which is 3D-compatible. It is also possible to provide an order receiving apparatus with means for synthesizing and printing 3D images.

The order receiving apparatus 62 of this embodiment allows the amount of parallax to be adjusted in the laboratory using the indispensable print area 42 as specified by the orderer and, accordingly, allows a photo print of a 3D image indispensably including the area which is expected by the orderer to be printed.

Figure 7:
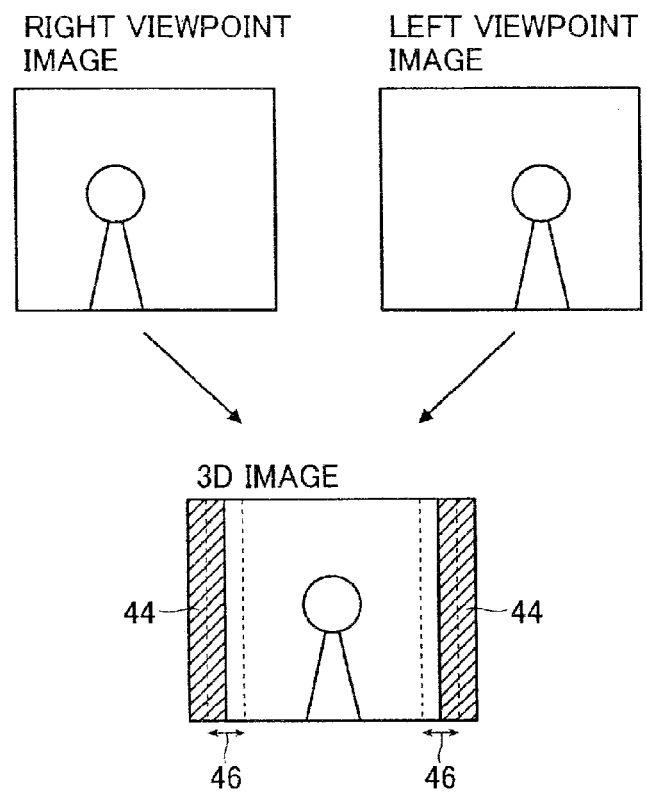
FIG. 7 is a diagram schematically illustrating the relationship between right and left viewpoint images and a 3D image.

Parallax adjustment ranges 46 shown in FIG. 7 (see a 3D image in a lower part of the figure), in each of which the amount of parallax between a right viewpoint image (in an upper left part of the figure) and a left viewpoint image (in an upper right part of the figure) (or between two out of multi-viewpoint images) allowing an appropriate synthesis of a 3D image is adjustable, are limited, that is to say, a 3D image fails to be appropriately synthesized not only with too large an amount of parallax but too small an amount of parallax. On the other hand, the orderer may specify the indispensable print area 42 in the area where synthesis of a 3D image is not possible (namely, the area out of mergence 44).

Figure 8:
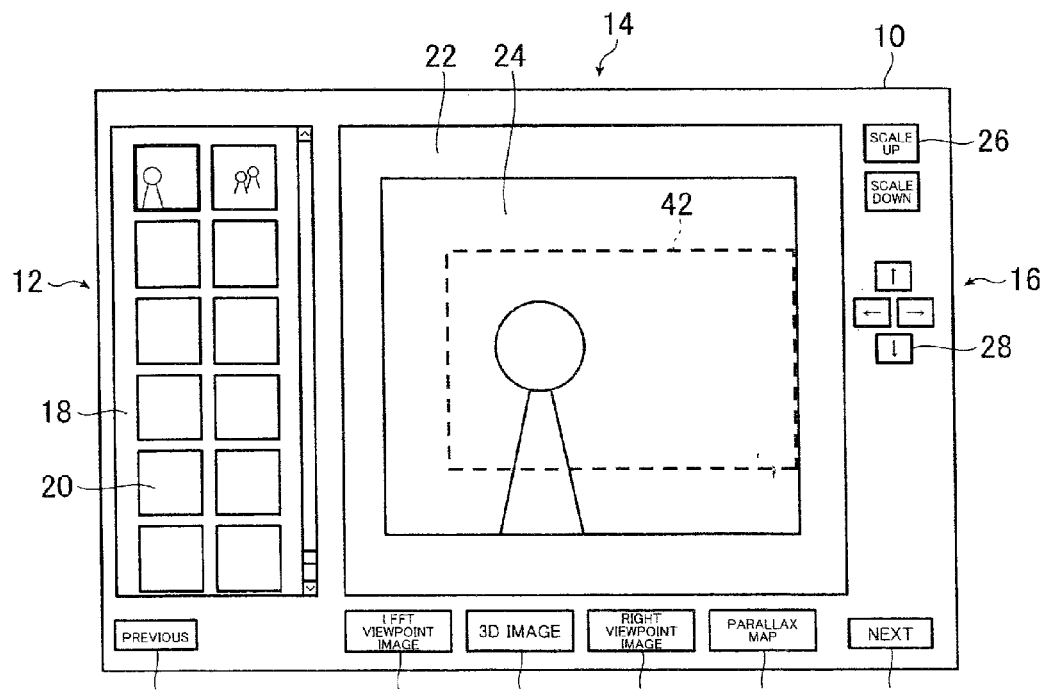
FIG. 8 is a diagram schematically illustrating that an indispensable print area extending to the right end of the selected image is specified.
Figure 9:
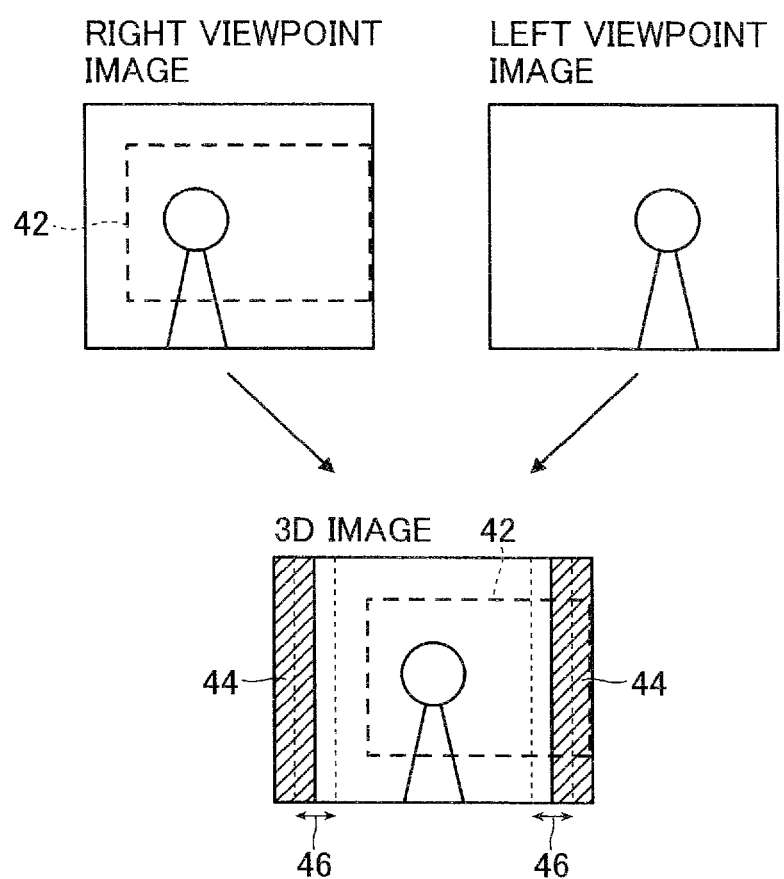
FIG. 9 is a diagram schematically illustrating the relationship between an indispensable print area and areas out of mergence.

It is assumed, for instance, that the selected image 24 as displayed in the display window 22 of the selected image displaying section 14 is a right viewpoint image, and the orderer specifies the indispensable print area 42 which extends to the right end of the selected image 24, as shown in FIG. 8. Then, as shown in FIG. 9, certain areas at the right and left ends of a 3D image constitute the areas out of mergence 44 in accordance with the amount of parallax, so that the indispensable print area 42 as above includes part of the area out of mergence 44 at the right end. The circumstances are the same for a left viewpoint image.

In the order receiving apparatus 62 of this embodiment, one corresponding area out of mergence 44 is indicated, by the control unit 64, in the right or left viewpoint image as displayed in the display window 22 of the selected image displaying section 14, as shown in FIGS. 10 and 11. Consequently, the orderer can recognize at least one area out of mergence 44 in advance even if a right or left viewpoint image is only displayed, and prevent the indispensable print area 42 from overlapping the area out of mergence 44.

Figure 12:
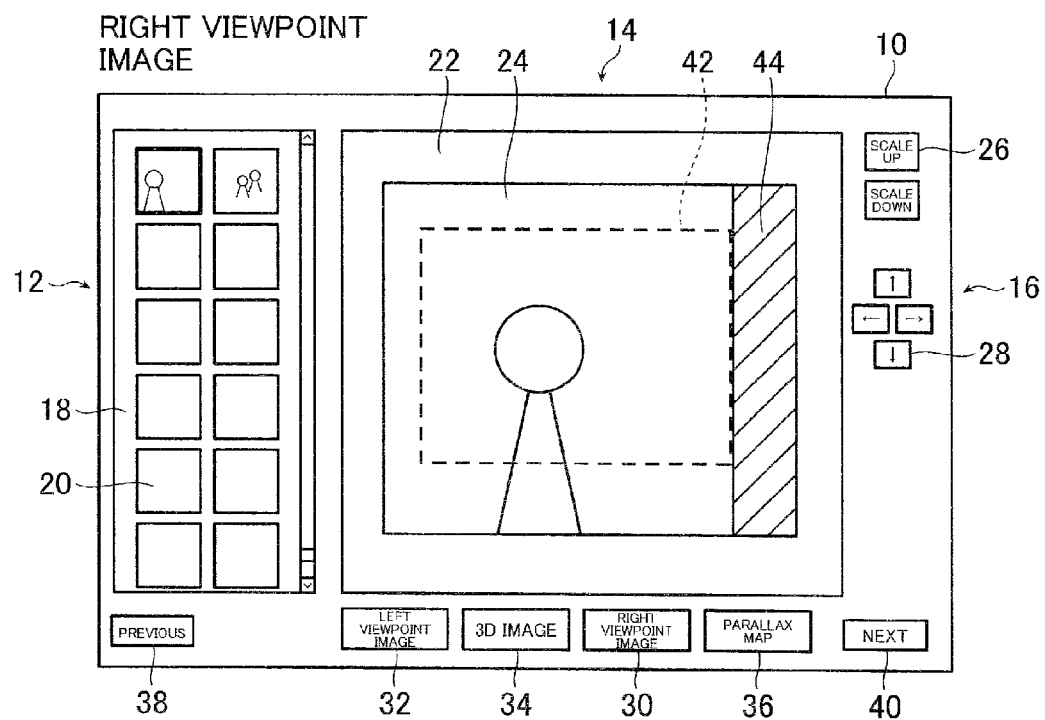
FIG. 12 is a diagram schematically illustrating that the range in which an indispensable print area is able to be specified is restricted to a mergeable area.

The range in which the orderer is able to specify the indispensable print area 42 may be restricted by the control unit 64 to an area (mergeable area) other than the areas out of mergence 44, as shown in FIG. 12. It is also possible to warn (through a warning message displayed, an audible alarm or the like) that the indispensable print area 42 and one or both of the areas out of mergence 44 overlap if the area 42 is so specified as to overlap the area or areas 44.

Figure 13:
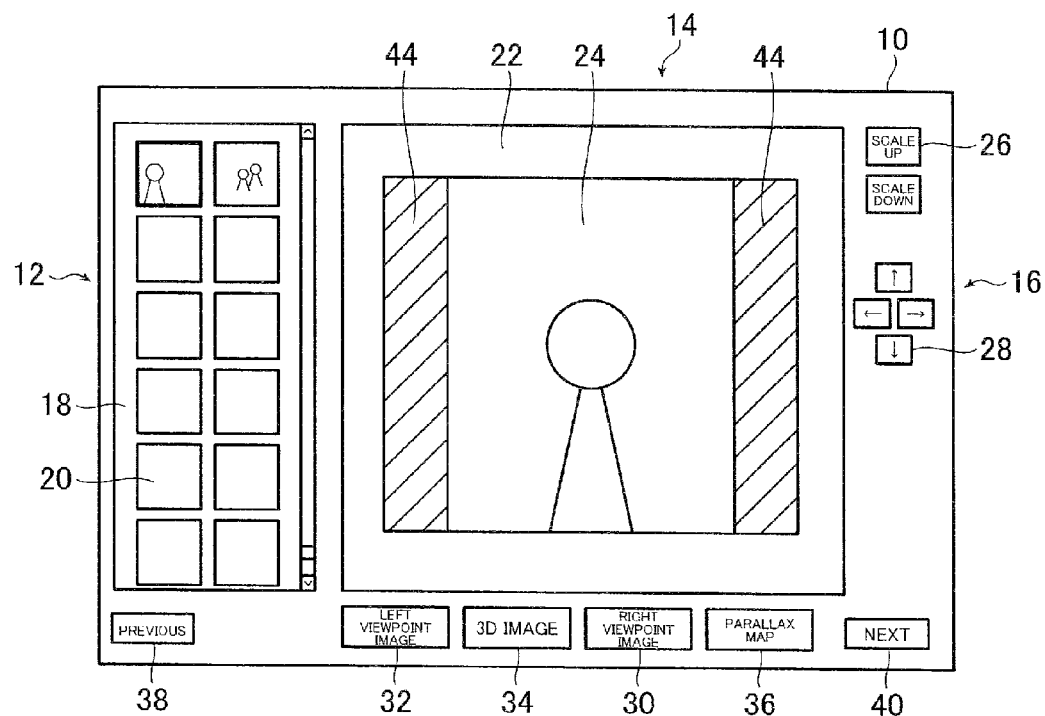
FIG. 13 is a diagram schematically illustrating that areas out of mergence are indicated in a 3D image in a superimposed manner.

If the monitor 68 has a function of displaying 3D images, it is desirable that the areas out of mergence 44 are also indicated, in a superimposed manner, in a 3D image displayed as the selected image 24, as shown in FIG. 13. Similarly, it is desirable that the areas out of mergence 44 are also indicated in a parallax map displayed as the selected image 24. In other words, the control unit 64 works so that the areas out of mergence 44 may be indicated in the selected image 24 as displayed on the monitor 68.

There basically exists a certain amount of parallax (reference parallax) between a right viewpoint image and a left viewpoint image. An operator in the laboratory adjusts the depth of a 3D image by physically displacing right and left viewpoint images in horizontal directions so as to adjust the amount of parallax, whereupon parallax adjustment ranges are defined based on the position of the reference parallax. Accordingly, each area out of mergence 44 extends from a horizontal end of the selected image 24 to the maximum adjustment end of a parallax adjustment range at its maximum.

Figure 14:
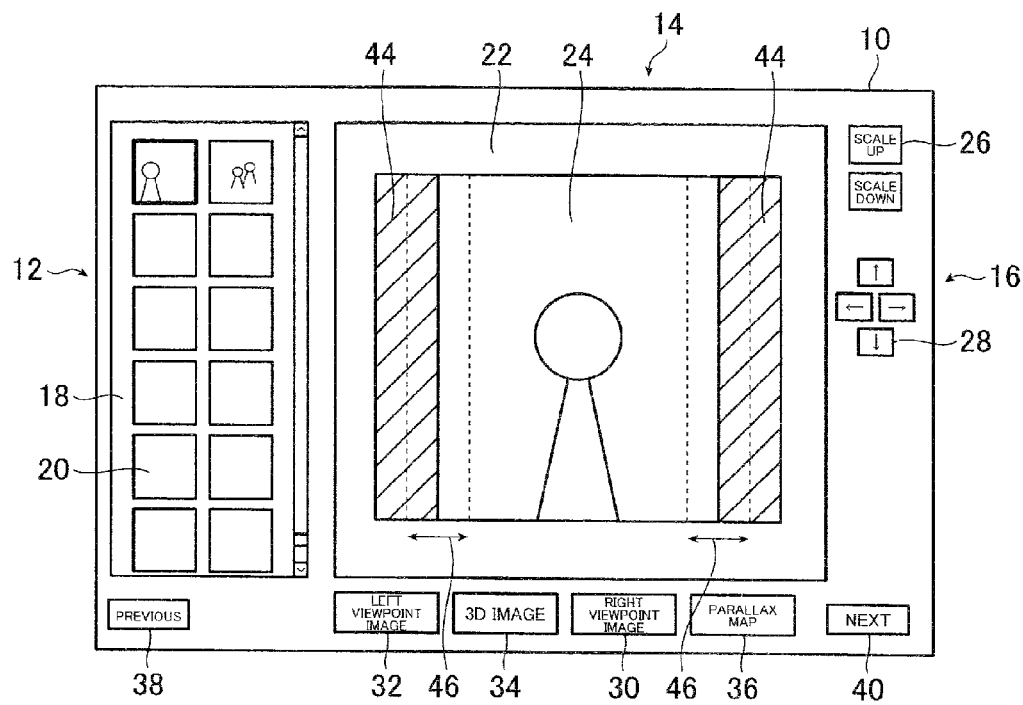
FIG. 14 is a schematic diagram for explaining that the boundary between each area out of mergence and a mergeable area is positioned within a parallax adjustment range.

As shown in FIG. 14, the order receiving apparatus 62 of this embodiment allows a service provider making photo prints of 3D images to position the boundaries between the areas out of mergence 44 and the mergeable area at will within the parallax adjustment ranges 46. In other words, the orderer selects predetermined positions in the parallax adjustment ranges 46 through the input device 66 such as a touch panel or a mouse, and the areas out of mergence 44 are defined by the control unit 64 in accordance with the selected positions.

Figure 15A:
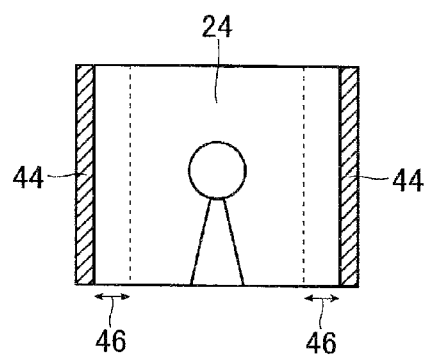
FIGS. 15A and 15B are diagrams schematically illustrating that the boundary between each area out of mergence and a mergeable area is positioned at the minimum adjustment end of a parallax adjustment range from a horizontal end of the selected image.
Figure 15B:
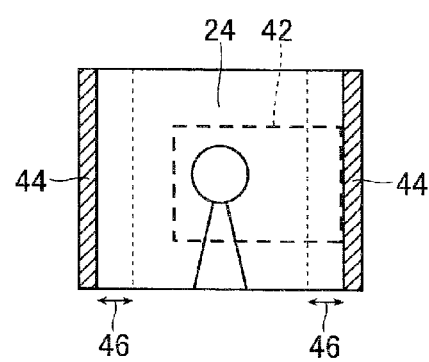

If the boundaries between the areas out of mergence 44 and the mergeable area are positioned at the minimum adjustment ends of the parallax adjustment ranges 46 from the horizontal end of the selected image 24 as shown in FIG. 15A, for instance, the range in which the orderer is able to specify the indispensable print area 42 is wide indeed. Parallax adjustment by an operator in the laboratory, however, is absolutely impossible if the indispensable print area 42 as specified by the orderer extends to the boundary between one area out of mergence 44 and the mergeable area as shown in FIG. 15B.

Figure 16:
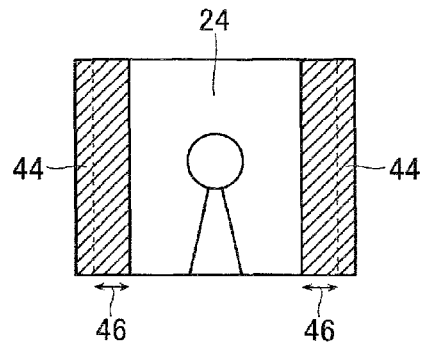
FIG. 16 is a diagram schematically illustrating that the boundary between each area out of mergence and a mergeable area is positioned at the maximum adjustment end of a parallax adjustment range from a horizontal end of the selected image.

If the boundaries between the areas out of mergence 44 and the mergeable area are positioned at the maximum adjustment ends of the parallax adjustment ranges 46 from the horizontal end of the selected image 24 as shown in FIG. 16, an operator in the laboratory freely adjusts the amount of parallax within the parallax adjustment ranges 46, although the range in which the orderer is able to specify the indispensable print area 42 is narrowed.

As mentioned above, it is actually possible to position the boundaries between the areas out of mergence 44 and the mergeable area at will within the parallax adjustment ranges 46 by selecting not the minimum or maximum adjustment ends of the ranges 46 but appropriate positions in the ranges 46. The areas out of mergence 44 may also be defined based on the position of a subject in the selected image 24. In that case, it is desirable, for instance, that a person is detected in the selected image 24 by the human figure detector 76, and the areas out of mergence 44 are so defined by the control unit 64 as not to contain the detected person.

Figure 17:
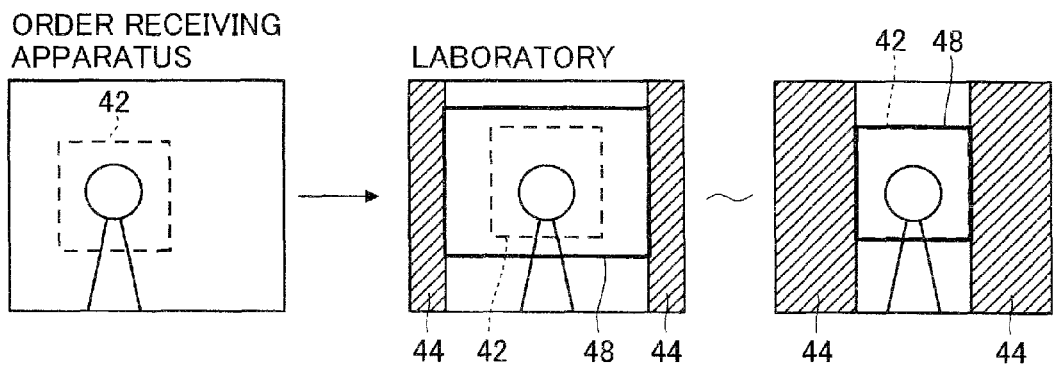
FIG. 17 is a schematic diagram for explaining that a print area varies with a mergeable area.

A problem with 3D images is that it is hardly possible for the orderer to imagine the final (photo) print (composition thereof) solely by specifying the indispensable print area 42 in such a manner as represented in the display screen of an order receiving apparatus as shown at the left of FIG. 17.

If a photo print of large size (89×127 mm) is to be made, for instance, the areas out of mergence 44 vary, that is to say, the mergeable area varies with the results of 3D image depth adjustment, namely parallax amount adjustment by an operator in the laboratory, as seen from the rightward part of FIG. 17 that shows display screens in the laboratory. Since an area located anywhere in the mergeable area may be selected as a print area 48, the area to be photo printed, and printed at any magnification as long as it includes the indispensable print area 42, the composition of a photo print actually obtained from the selected image varies considerably.

Figure 18:
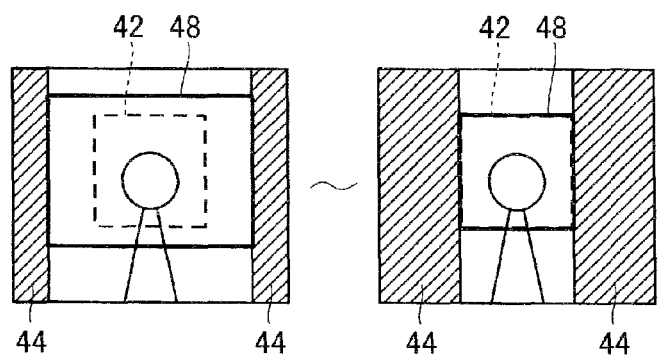
FIG. 18 is a diagram schematically illustrating that the boundary between each area out of mergence and a mergeable area varies in position.

In order to address the above problem, in the order receiving apparatus 62 of this embodiment, the print size is inputted through the input device 66, then a plurality of printing samples of the inputted photo print size differing from one another in the print area 48, which includes the indispensable print area 42 and is to be reproduced as a photo print, are generated by the image generator 78 from right and left viewpoint images in accordance with the areas out of mergence 44 varying within the parallax adjustment ranges 46 as shown in FIG. 18. The printing samples differing from one another in the print area 48 are caused by the control unit 64 to be displayed on the display screen 10.

Figure 19A:
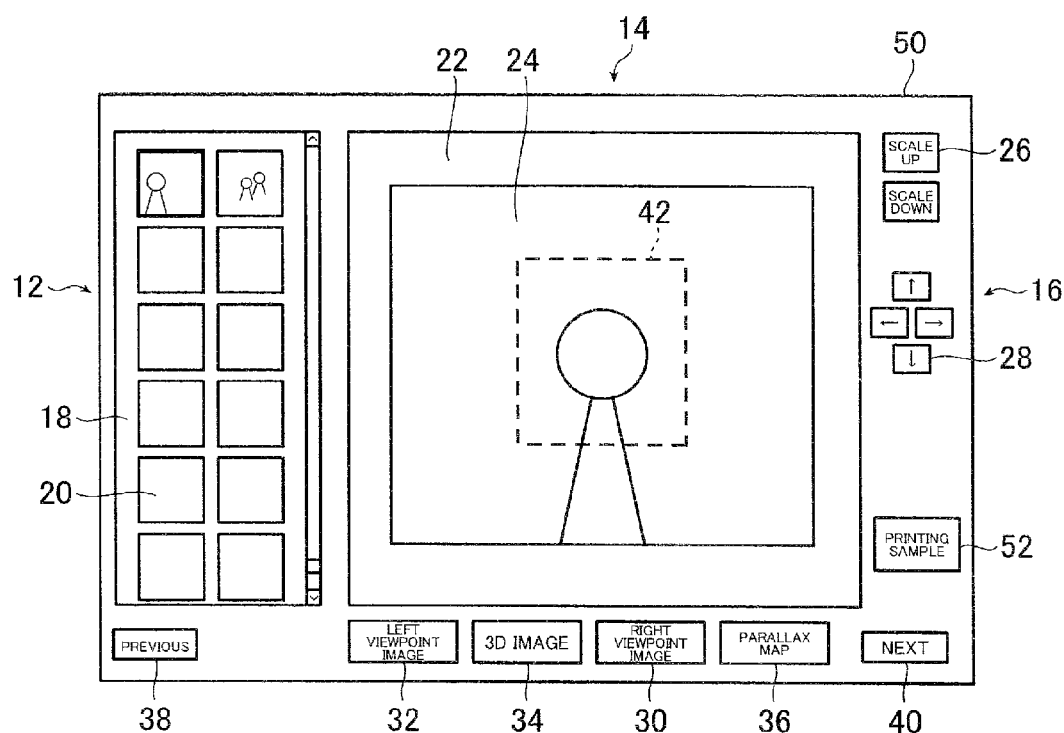
FIGS. 19A and 19B are exemplary representations schematically illustrating that a plurality of printing samples are displayed if the print size is designated.
Figure 19B:
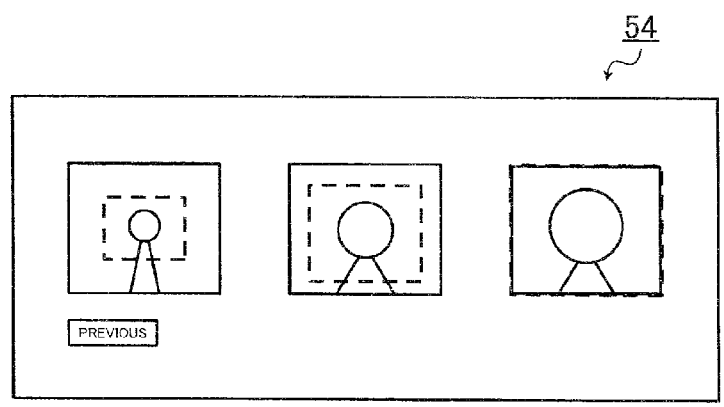

FIGS. 19A and 19B are exemplary representations schematically illustrating that a plurality of printing samples are displayed if the print size is designated. A display screen 50 shown in FIG. 19A is identical to the display screen 10 of FIG. 2 except for a "printing sample" button 52 displayed in the operating button displaying section 16, with the button 52 being used for displaying printing samples.

If the orderer, who has designated large size as the print size, and specified the indispensable print area 42, selects the "printing sample" button 52, the displayed scene is changed into another, the scene as displayed on a display screen 54 shown in FIG. 19B. On the display screen 54, a plurality of large-size printing samples are displayed with respect to the print area 48 including the indispensable print area 42. From among the printing samples as displayed on the display screen 54, the orderer selects one whose photo print he/she wants to practically make. Thus, the orderer can get a photo print close to the selected printing sample.

Figure 20:
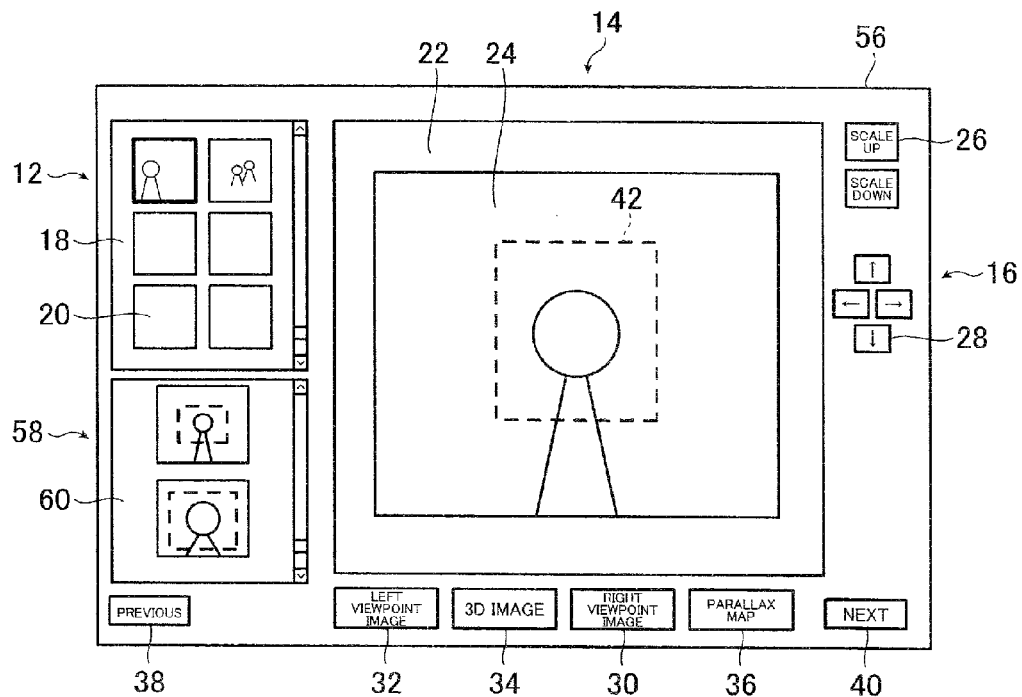
FIG. 20 is another exemplary representation schematically illustrating that a plurality of printing examples are displayed if the print size is designated.

FIG. 20 is another exemplary representation schematically illustrating that a plurality of printing examples are displayed if the print size is designated. A display screen 56 shown in the figure is identical to the display screen 10 of FIG. 2 except that a printing sample displaying section 58 for displaying a plurality of printing samples is included in the displayed scene.

The printing sample displaying section 58 is the section in which a plurality of printing samples are displayed in the form of a thumbnail image list. A display window 60 in a lower left part of the display screen 56 serves as the section 58. Similar to the case of the image list displaying section 12, the number of thumbnail images displayed in the display window 60 at a time is limited and, on the other hand, the thumbnail images to be displayed may be changed using a scroll bar provided along the right side of the display window 60.

Thumbnail images displayed in the display window 60 of the printing sample displaying section 58 may be changed in real time in accordance with the change (correction) of the specified indispensable print area 42, if any.

The following discussion is concerned with the case where the areas out of mergence 44 are gradually increased, that is to say, the mergeable area is gradually decreased in horizontal directions in accordance with the parallax adjustment. It is assumed that the print area 48 and the areas out of mergence 44 touch each other at their corresponding horizontal ends, and the print area 48 is gradually reduced in size while its aspect ratio is maintained.

Figure 21:
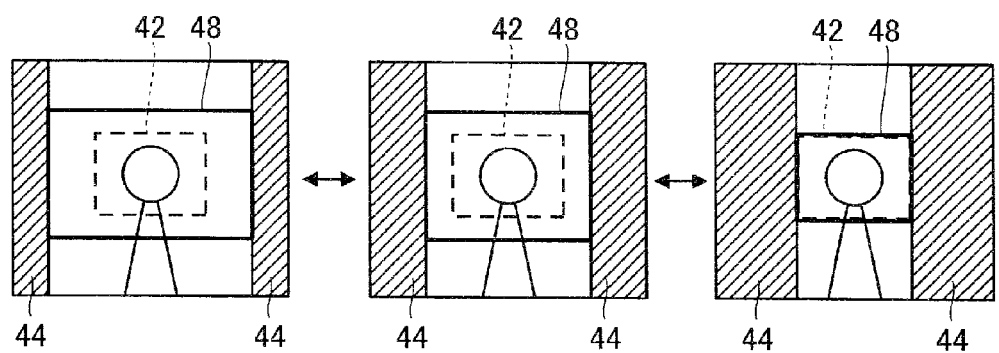
FIG. 21 is a diagram schematically illustrating an exemplary relationship between the aspect ratio of a print area and that of an indispensable print area.

If the aspect ratio of the indispensable print area 42 is not smaller than that of the print area 48, the area 48 will not be smaller than the area 42 in vertical size when the areas 48 and 42 are horizontally coincident with each other, that is to say, the indispensable print area 42 is always included in the print area 48 as shown in FIG. 21, which raises no problems.

Figure 22:
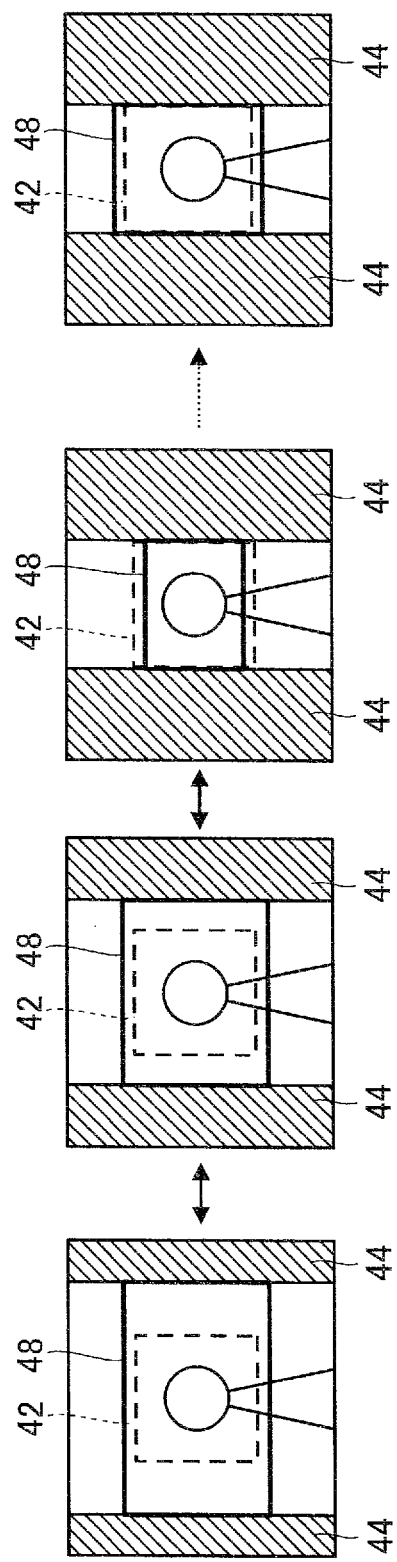
FIG. 22 is a diagram schematically illustrating another exemplary relationship between the aspect ratio of a print area and that of an indispensable print area.

In contrast, if the aspect ratio of the indispensable print area 42 is smaller than that of the print area 48, the area 48 may be smaller than the area 42 in vertical size when the areas 48 and 42 are horizontally coincident with each other, that is to say, the indispensable print area 42 may partially be unable to be included in the print area 48 as shown in FIG. 22. In that case, the control unit 64 may rotate the print area 48 ninety degrees and increase it in size, while maintaining its aspect ratio, so that the print area 48 as rotated and the areas out of mergence 44 may touch each other at their corresponding horizontal ends, and the print area 48 as rotated may be at least equal to the indispensable print area 42 in vertical size.

Available printing samples also depend on whether or not the indispensable print area 42 is in the parallax adjustment ranges 46.

Figure 23:
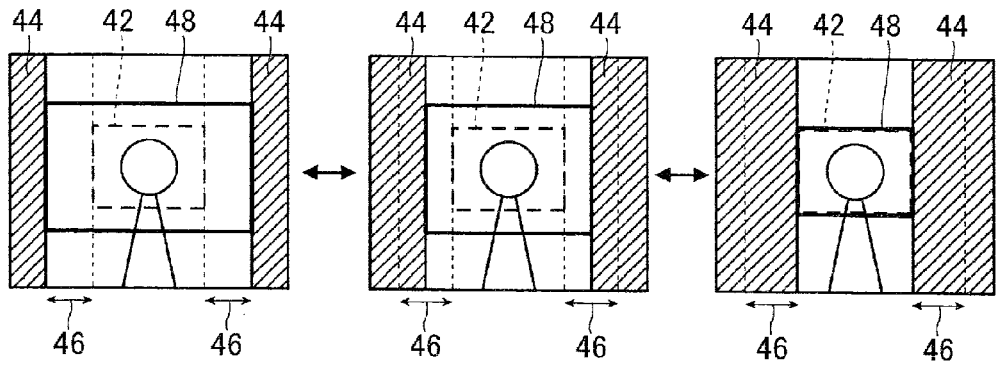
FIG. 23 is a diagram schematically illustrating an exemplary relationship between an indispensable print area and parallax adjustment ranges.

In the case where the indispensable print area 42 is in neither of the parallax adjustment ranges 46 as shown in FIG. 23, the area 42 overlaps neither of the areas out of mergence 44 even if the amount of parallax is adjusted at the maximum, that is to say, even if the areas 44 extend to the maximum adjustment ends of the ranges 46, so that there arise no problems.

Figure 24:
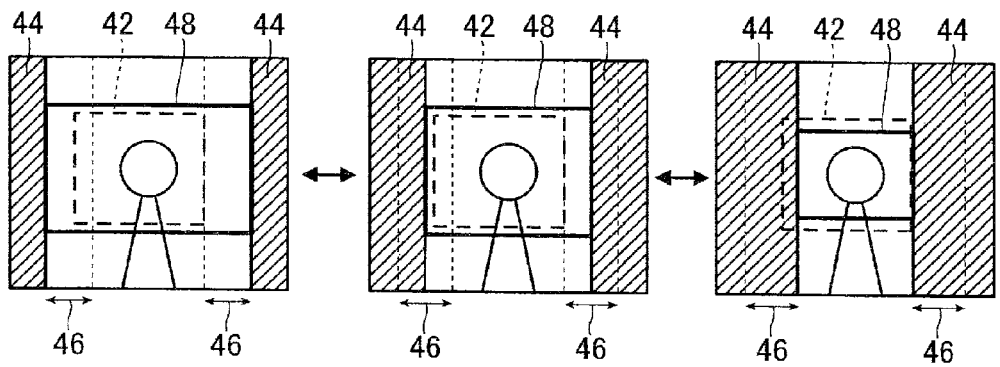
FIG. 24 is a diagram schematically illustrating another exemplary relationship between an indispensable print area and parallax adjustment ranges.

In the case where the indispensable print area 42 is in one of the parallax adjustment ranges 46 as shown in FIG. 24, the indispensable print area 42 inevitably overlaps one of the areas out of mergence 44 if the amount of parallax is adjusted at the maximum, for instance, which makes synthesis of a 3D image impossible. In other words, in that case, it is not possible to adjust the amount of parallax in the entire ranges 46. Those printing samples are only considered as available which each include the indispensable print area 42 overlapping neither of the areas out of mergence 44. Thus, the printing samples which can practically be photo printed are solely displayed.

The order receiving apparatus according to the present invention may be implemented not only as an order receiving apparatus (shopfront order receptor) placed in an agency for photo printing but a personal computer used for placing an order through a webpage on the Internet, or a camera for taking two or more images concurrently at different viewpoints.

The order receiving system according to the present invention includes a plurality of order receiving apparatus. If the order receiving system includes first and second order receiving apparatus, for instance, the first order receiving apparatus has such an output device as described before, while the second order receiving apparatus has an acceptance device adapted to the output device. The right and left viewpoint images, or multi-viewpoint images, and the information on an indispensable print area as outputted from the output device (e.g., transmission device) of the first order receiving apparatus are accepted by the acceptance device (e.g., reception device) of the second order receiving apparatus, which allows the two order receiving apparatus to share these data.

Such data sharing among a plurality of order receiving apparatus makes it possible to utilize the contents of the processing as performed in one order receiving apparatus for the processing to be performed in another order receiving apparatus, that is to say, allows each orderer to utilize the contents of the processing as performed by any other orderer for the processing to be performed by the relevant orderer. As an example, the indispensable output area as accepted from a first order receiving apparatus may be caused by a control unit of a second order receiving apparatus to be indicated in the image as displayed on a monitor of the second order receiving apparatus.

Figure 25A:
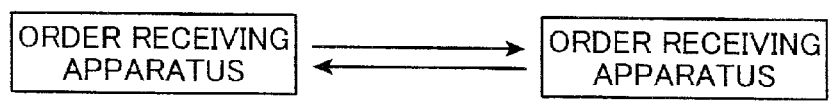
FIGS. 25A and 25B are each a block diagram of an embodiment of the order receiving system according to the present invention, representing the structure thereof.
Figure 25B:
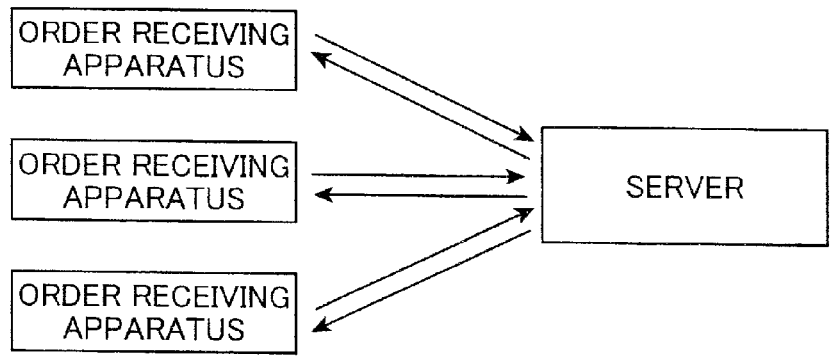

In the case where an order receiving system includes two order receiving apparatus, the apparatus may share data by transmitting and receiving the data through a cable connecting them directly with each other as shown in FIG. 25A, or by inputting and outputting the data using a recording medium. If the order receiving system includes three or more order receiving apparatus, data sharing may be carried out by providing a server for storing data, which is made accessible to the individual order receiving apparatus via telecommunications lines for data transmission and reception as shown in FIG. 25B.

Moreover, the image processing apparatus according to the present invention is not limited to order receiving apparatus, and output of prints (e.g., printing) either. Any apparatus can be considered as the inventive image processing apparatus as long as it is capable of displaying an image on a monitor based on right and left viewpoint images, or multi-viewpoint images, accepting information on the indispensable output area which a user wants to be outputted, and indicating the area in the image as displayed on the monitor, as well as outputting right and left viewpoint images, or multi-viewpoint images, and information on an indispensable output area. The image processing apparatus of the invention may be implemented as a personal computer or a camera.

Similarly, the image processing system according to the present invention is not limited to order receiving systems, and output of prints either. Any system can be considered as the inventive image processing system as long as it is a combination of two or more image processing apparatus of the invention. In a possible system: A camera and a personal computer are combined with each other as two image processing apparatus. A user takes an image with the camera while away from home, and specifies an indispensable print area on the camera with respect to the data on the taken image. The image data associated with information on the indispensable print area are transferred to the personal computer at home so as to synthesize a 3D image, and cause a 3D-compatible printer to perform printing.

The present invention is essentially as described above.

The present invention is not limited to the embodiments as detailed above and, as a matter of course, various improvements and modifications may be made within the scope of the present invention.

What is claimed is:

1. An image processing apparatus for processing a right viewpoint image and a left viewpoint image, or multi-viewpoint images, with parallax, comprising:
    a monitor configured to display an image based on the right viewpoint image and left viewpoint image, or multi-viewpoint images, with the displayed image being used by a user for specifying an indispensable output area which the user wants to be included in a 3D image synthesized by merging the right viewpoint image and left viewpoint image, or multi-viewpoint images, together, and outputted;
    operating buttons configured to input information on the indispensable output area as specified by the user referring to the image as displayed on the monitor;
    a control processor configured to cause the indispensable output area to be indicated in the image as displayed on the monitor;
    an output processor configured to output the right viewpoint image and left viewpoint image, or multi-viewpoint images, and information on the indispensable output area;
    a parallax map generation processor configured to generate a parallax map as a visualization of parallaxes between corresponding pixels of said right viewpoint image and left viewpoint image, or two images out of said multi-viewpoint images; and
    a human figure detection processor configured to detect a person contained in the image as displayed on said monitor,
    wherein said monitor is adapted to display the parallax map as the image used for specifying said indispensable output area in pseudocolor or gray scale in accordance with the parallaxes,
    wherein said control processor is adapted to cause an area out of mergence to be indicated in the image as displayed on said monitor, with the area out of mergence being unable to be included in said 3D image outputted, and being defined in accordance with an amount of parallax between said right viewpoint image and left viewpoint image, or two images out of said multi-viewpoint images, when the 3D image is synthesized by merging the right viewpoint image and left viewpoint image, or multi-viewpoint images, together, and
    wherein said control processor is adapted to define said area out of mergence so that the person as detected by the human figure detection processor may not be contained in the area out of mergence.

2. The image processing apparatus according to claim 1, wherein said control processor is adapted to restrict a range in which said user is able to specify said indispensable output area to a mergeable area other than said area out of mergence, when the user specifies the indispensable output area.

3. The image processing apparatus according to claim 1, wherein said control processor is adapted to warn that said indispensable output area and said area out of mergence overlap if the indispensable output area is so specified as to overlap the area out of mergence.

4. The image processing apparatus according to claim 1, wherein said control processor is adapted to check a 3D image depth throughout the image based on said parallax map, automatically select an area in which the 3D image depth is maximum for the person as detected by the human figure detection processor as said indispensable output area, and cause the selected area to be indicated on said monitor.

5. The image processing apparatus according to claim 1, further comprising an image generation processor configured to generate a plurality of output samples of an output size inputted through said operating buttons, which differ from one another in an output area for said 3D image and include said indispensable output area, wherein:
    said control processor is adapted to cause the output samples differing from one another in the output area to be displayed on said monitor.

6. An image processing system, comprising first and second image processing apparatus which are each the image processing apparatus according to claim 1, wherein:
    the second image processing apparatus further comprises an acceptance processor configured to accept said right viewpoint image and left viewpoint image, or multi-viewpoint images, and information on said indispensable output area;
    the output processor of the first image processing apparatus is adapted to output the right viewpoint image and left viewpoint image, or multi-viewpoint images, and information on the indispensable output area; and
    the acceptance processor of the second image processing apparatus is adapted to accept the right viewpoint image and left viewpoint image, or multi-viewpoint images, and the information on the indispensable output area as outputted from the first image processing apparatus.

7. The image processing system according to claim 6, wherein the control processor of said second image processing apparatus is adapted to cause an indispensable output area accepted from said first image processing apparatus to be indicated in the image as displayed on the monitor of the second image processing apparatus.

8. The image processing system according to claim 6, further comprising a printing processor configured to synthesize a 3D image from said right viewpoint image and left viewpoint image, or multi-viewpoint images, and the information on said indispensable output area, and to make a print of the 3D image.

9. The image processing system according to claim 6, wherein the 3D image is adapted to synthesize by displacing the right viewpoint image and left viewpoint image, or multi-viewpoint images, physically in horizontal directions to adjust an amount of the parallax and to modify a depth of the 3D image.

10. An image processing method applicable to an image processing system comprising first and second image processing apparatus which are each the image processing apparatus according to claim 1, with the second image processing apparatus further comprising an acceptance processor configured to accept said right viewpoint image and left viewpoint image, or multi-viewpoint images, and information on said indispensable output area,
    wherein the output processor of the first image processing apparatus outputs the right viewpoint image and left viewpoint image, or multi-viewpoint images, and information on the indispensable output area; and
    wherein the acceptance processor of the second image processing apparatus accepts the right viewpoint image and left viewpoint image, or multi-viewpoint images, and the information on the indispensable output area as outputted from the first image processing apparatus.

11. The image processing method according to claim 10, wherein the 3D image is adapted to synthesize by displacing the right viewpoint image and left viewpoint image, or multi-viewpoint images, physically in horizontal directions to adjust an amount of the parallax and to modify a depth of the 3D image.

12. The image processing apparatus according to claim 1, wherein the 3D image is adapted to synthesize by displacing the right viewpoint image and left viewpoint image, or multi-viewpoint images, physically in horizontal directions to adjust an amount of the parallax and to modify a depth of the 3D image.

13. An image processing apparatus for processing a right viewpoint image and a left viewpoint image, or multi-viewpoint images, with parallax, comprising:
    a monitor configured to display an image based on the right viewpoint image and left viewpoint image, or multi-viewpoint images, with the displayed image being used by a user for specifying an indispensable output area which the user wants to be included in a 3D image synthesized by merging the right viewpoint image and left viewpoint image, or multi-viewpoint images, together, and outputted;
    operating buttons configured to input information on the indispensable output area as specified by the user referring to the image as displayed on the monitor;
    a control processor configured to cause the indispensable output area to be indicated in the image as displayed on the monitor;
    an output processor configured to output the right viewpoint image and left viewpoint image, or multi-viewpoint images, and information on the indispensable output area;
    a parallax map generation processor configured to generate a parallax map as a visualization of parallaxes between corresponding pixels of said right viewpoint image and left viewpoint image, or two images out of said multi-viewpoint images; and
    an image generation processor configured to generate a plurality of output samples of an output size inputted through said operating buttons, which differ from one another in an output area for said 3D image and include said indispensable output area,
    wherein said monitor is adapted to display the parallax map as the image used for specifying said indispensable output area in pseudocolor or gray scale in accordance with the parallaxes,
    wherein said control processor is adapted to cause an area out of mergence to be indicated in the image as displayed on said monitor, with the area out of mergence being unable to be included in said 3D image outputted, and being defined in accordance with an amount of parallax between said right viewpoint image and left viewpoint image, or two images out of said multi-viewpoint images, when the 3D image is synthesized by merging the right viewpoint image and left viewpoint image, or multi-viewpoint images, together,
    wherein said control processor is adapted to cause the output samples differing from one another in the output area to be displayed on said monitor, and
    wherein with respect to an output sample in which said output area is vertically made smaller than said indispensable output area if the output area is reduced in size as said area out of mergence horizontally gets larger, with the output area and the area out of mergence being kept touching each other at their corresponding horizontal ends, and an aspect ratio of the output area being maintained, said control processor is adapted to rotate the output area 90 degrees and make it larger, while maintaining its aspect ratio, so that the output area as rotated and the area out of mergence may touch each other at their corresponding horizontal ends, and the output area as rotated may be at least equal to the indispensable output area in vertical size.

14. An image processing apparatus for processing a right viewpoint image and a left viewpoint image, or multi-viewpoint images, with parallax, comprising:
    a monitor configured to display an image based on the right viewpoint image and left viewpoint image, or multi-viewpoint images, with the displayed image being used by a user for specifying an indispensable output area which the user wants to be included in a 3D image synthesized by merging the right viewpoint image and left viewpoint image, or multi-viewpoint images, together, and outputted;
    operating buttons configured to input information on the indispensable output area as specified by the user referring to the image as displayed on the monitor;
    a control processor configured to cause the indispensable output area to be indicated in the image as displayed on the monitor;
    an output processor configured to output the right viewpoint image and left viewpoint image, or multi-viewpoint images, and information on the indispensable output area; and
    a parallax map generation processor configured to generate a parallax map as a visualization of parallaxes between corresponding pixels of said right viewpoint image and left viewpoint image, or two images out of said multi-viewpoint images, wherein said monitor is adapted to display the parallax map as the image used for specifying said indispensable output area in pseudocolor or gray scale in accordance with the parallaxes, wherein said control processor is adapted to cause an area out of mergence to be indicated in the image as displayed on said monitor, with the area out of mergence being unable to be included in said 3D image outputted, and being defined in accordance with an amount of parallax between said right viewpoint image and left viewpoint image, or two images out of said multi-viewpoint images, when the 3D image is synthesized by merging the right viewpoint image and left viewpoint image, or multi-viewpoint images, together, wherein said control processor is adapted to define said area out of mergence in accordance with a position selected in a parallax adjustment range and inputted through said operation buttons by said user, and wherein, if said indispensable output area is so specified as to overlap said parallax adjustment range, said control unit is adapted not to cause an output sample, in which the indispensable output area and said area out of mergence overlap, to be displayed on said monitor.

15. An image processing method for processing a right viewpoint image and a left viewpoint image, or multi-viewpoint images, with parallax, comprising:

generating a parallax map as a visualization of parallaxes between corresponding pixels of said right viewpoint image and left viewpoint image, or two images out of said multi-viewpoint images by a parallax map generator, displaying the parallax map as an image displayed on a monitor in pseudocolor or gray scale in accordance with the parallaxes based on the right viewpoint image and left viewpoint image, or multi-viewpoint images, with the displayed image being used by a user for specifying an indispensable output area which the user wants to be included in a 3D image synthesized by merging the right viewpoint image and left viewpoint image, or multi-viewpoint images, together, and outputted;

inputting through an input device information on the indispensable output area as specified by the user referring to the image as displayed on the monitor;

causing, by a control unit, the indispensable output area to be indicated in the image as displayed on the monitor;

causing, by said control unit, an area out of mergence to be indicated in the image displayed on said monitor, with the area out of mergence being unable to be included in said 3D image outputted, and being defined in accordance with an amount of parallax between said right viewpoint image and left viewpoint image, or two images out of said multi-viewpoint images, when the 3D image is synthesized by merging the right viewpoint image and left viewpoint image, or multi-viewpoint images, together;

detecting, by a human figure detector, a person contained in the image displayed on the monitor;

defining, by said control unit, said area out of mergence so that the person detected by the human figure detector may not be contained in the area out of mergence; and outputting the right viewpoint image and left viewpoint image, or multi-viewpoint images, and the information on the indispensable output area from an output device.

16. The image processing method according to claim 15, wherein the 3D image is adapted to synthesize by displacing the right viewpoint image and left viewpoint image, or multi-viewpoint images, physically in horizontal directions to adjust an amount of the parallax and to modify a depth of the 3D image.

* * * * *